United States Patent
Wang et al.

(10) Patent No.: US 12,153,907 B2
(45) Date of Patent: Nov. 26, 2024

(54) METHOD FOR OPERATING SECOND SYSTEM APPLICATION ON FIRST SYSTEM, TERMINAL DEVICE AND STORAGE MEDIUM

(71) Applicant: PAX COMPUTER TECHNOLOGY (SHENZHEN) CO., LTD., Guangdong (CN)

(72) Inventors: Yanfei Wang, Guangdong (CN); Lihong Xie, Guangdong (CN); Chuan Liu, Guangdong (CN)

(73) Assignee: PAX COMPUTER TECHNOLOGY (SHENZHEN) CO., LTD., Guangdong (CN)

( * ) Notice: Subject to any disclaimer, the term of this patent is extended or adjusted under 35 U.S.C. 154(b) by 17 days.

(21) Appl. No.: 18/017,111

(22) PCT Filed: Jul. 14, 2021

(86) PCT No.: PCT/CN2021/106336
§ 371 (c)(1),
(2) Date: Jan. 20, 2023

(87) PCT Pub. No.: WO2022/017242
PCT Pub. Date: Jan. 27, 2022

(65) Prior Publication Data
US 2023/0297348 A1 Sep. 21, 2023

(30) Foreign Application Priority Data
Jul. 21, 2020 (CN) .......................... 202010702737.3

(51) Int. Cl.
*G06F 9/00* (2018.01)
*G06F 8/41* (2018.01)
(Continued)

(52) U.S. Cl.
CPC . *G06F 8/41* (2013.01); *G06F 8/61* (2013.01)

(58) Field of Classification Search
CPC .......... G06F 8/41; G06F 8/61; G06F 9/45558; G06F 9/5077; G06F 8/658;
(Continued)

(56) References Cited

U.S. PATENT DOCUMENTS 10,164,892 B2 * 12/2018 Fusco ..................... H04L 47/36
2013/0326474 A1   12/2013 Lane

FOREIGN PATENT DOCUMENTS

| CN | 101859244 A | 10/2010 |
| CN | 103853589 A | 6/2014 |
| CN | 111984263 A | 11/2020 |

OTHER PUBLICATIONS

International Search Report (English) dated Oct. 12, 2021; International Application No. PCT/CN2021/106336, Filed Jul. 14, 2021; 2 pages.
(Continued)

*Primary Examiner* — Thuy Dao
(74) *Attorney, Agent, or Firm* — CANTOR COLBURN LLP

(57) ABSTRACT

A method for operating a second system application in a first system is provided. The method includes: creating an operating environment of the second system application through a loader on a target terminal; generating an application function component of the second system application in the loader; compiling script files of the second system application into dynamic library files by utilizing the compiling environment supported by the target terminal, and encapsulating the dynamic library files into an application package; installing the application package through the loader, and operating the dynamic library files in the application package under the operating environment. According to the aforesaid method, the target terminal can directly respond to
(Continued)

a system instruction generated during execution of the compiled dynamic library files without the need of parsing and converting the system instruction, thus, a cross-platform operation efficiency of the application program can be improved.

15 Claims, 4 Drawing Sheets

(51) Int. Cl.
*G06F 8/61* (2018.01)
*G06F 9/445* (2018.01)
*G06F 9/455* (2018.01)
*H04L 12/46* (2006.01)
*H04L 12/805* (2013.01)

(58) Field of Classification Search
CPC .. G06F 12/0868; G06F 9/3004; G06F 9/3861; G06F 9/45545
See application file for complete search history.

(56) References Cited

OTHER PUBLICATIONS

International Search Report (Non-English) dated Oct. 12, 2021; International Application No. PCT/CN2021/106336, Filed Jul. 14, 2021; 3 pages.
Written Opinon (Non-English) dated Oct. 8, 2021; International Application No. PCT/CN2021/106336, Filed Jul. 14, 2021; 4 pages.

* cited by examiner

METHOD FOR OPERATING SECOND SYSTEM APPLICATION ON FIRST SYSTEM, TERMINAL DEVICE AND STORAGE MEDIUM

This application is a National Stage of PCT Application No. PCT/CN2021/106336 filed on Jul. 14, 2021, which claims priority to Chinese patent application No. 202010702737.3 filed on Jul. 21, 2020, the entire contents each of which are incorporated herein by reference thereto.

TECHNICAL FIELD

The present application relates to the field of information technologies, and more particularly to a method and an apparatus for operating second system application on first system, a device, and a medium.

BACKGROUND

In the prior art, in order to implement cross-platform operation of an application program, a virtual machine is usually used to provide a virtual machine operating environment for an application on an intelligent terminal. However, when the application program is operated, the interaction between the virtual environment operated by the application program and the actual environment of the intelligent terminal is very complex. That is, in the operation process, operation instructions of the application program needs to be parsed one by one in the virtual environment, then, a hardware structure in the intelligent terminal is controlled to respond to the application program according to a parsed result of the operation instructions. However, during a process of parsing the operation instructions one by one by the application program, a cross-platform operation efficiency of the application program may be seriously affected.

SUMMARY OF THE INVENTION

Technical Problem

A method and an apparatus for operating a second system application on a first system, a device and a medium are provided in the embodiments of the present application, so that the cross-platform operation efficiency of the application program can be improved.

Technical Solutions for Soling the Problem

Technical Solutions

In the first aspect, a method for operating a second system application on a first system is provided in the embodiments of the present application, the method includes:
  creating an operating environment of the second system application through a loader on a target terminal; the first system is operated on the target terminal;
  creating an application function component of the second system application in the loader;
  compiling script files of the second system application into dynamic library files by utilizing a compiling environment supported by the target terminal, and encapsulating the dynamic library files into an application package;
  installing the application package through the loader, and executing the dynamic library files in the application package in the operating environment; when the dynamic library file is executed, a corresponding function in the target terminal is called through the application function component to realize an operation of the second system application in the first system.

In one embodiment, said creating the application function component of the second system application in the loader includes:
  obtaining a target function interface of the target terminal, and determining various application functions to be implemented by the second system application;
  programming a processing function for implementing the various application functions in the loader according to the target function interface, and generating application function interfaces corresponding to the various application functions according to the processing function; the plurality of application function interfaces are constituted as the application function component of the second system application;
  storing the application function component in the operating environment.

In one embodiment, said compiling the script files of the second system application into the dynamic library files using the compiling environment supported by the target terminal, and encapsulating the dynamic library files into the application package includes:
  determining the various application functions to be implemented by the second system application;
  creating a virtual application function component to be called by the second system application according to the various application functions; wherein the virtual application function component meets a programming requirement of the second system application;
  compiling the script files of the second system application containing the virtual application function component into the dynamic library files by utilizing the compiling environment supported by the target terminal, and encapsulating the dynamic library files into the application package; the application package meets an installation requirement of the target terminal.

In one embodiment, the method for operating the second system application on the first system further includes:
  respectively writing a strong attribute function into the script files corresponding to the various application function interfaces of the application function component; the strong attribute function includes first identifiers for identifying the various application function interfaces, respectively;
  respectively writing a weak attribute function into the script files corresponding to the various virtual application function interfaces of the virtual application function component; where the weak attribute function includes second identifiers for identifying the various virtual application function interfaces, respectively;
  establishing a correspondence relationship between the various application function interfaces in the application function component and the various virtual application function interfaces in the virtual application function component according to the first identifiers and the second identifiers. The application function interfaces corresponding to the strong attribute function are used to be called by the second system application to realize corresponding application functions of the second system.

In one embodiment, after said installing the application package through the loader and operating the dynamic library files in the application package in the operating environment, the method further includes:
  determining, if a corresponding application function cannot be implemented in the target terminal when the application function interface is called by the second system application, that the application function interface corresponding to the corresponding application function has a vulnerability;
  fixing the corresponding application function interface according to the vulnerability.

In one embodiment, said compiling the script files of the second system application containing the virtual application function component into the dynamic library files in the compiling environment supported by the target terminal, and encapsulating the dynamic library files into the application package includes:
  determining a compiling tool chain supported by the target terminal, and adding the compiling tool chain to a development tool; the compiling tool chain is used to enable the development tool to directly compile the script files of the second system application into the dynamic library files supported by the target terminal;
  compiling, after verifying that the virtual application function component is qualified, the script files of the second system application into the dynamic library files;
  determining a target packaging strategy of the target terminal according to an operation instruction of a user, and packaging, according to the target packaging strategy, the script files to generate the application package meeting the installation requirement of the target terminal.

In one embodiment, after said installing the application package through the loader and operating the dynamic library files in the application package in the operating environment, the method further includes:
  recording a system resource of the target terminal utilized by the second system application when the second system application is operated in the operating environment;
  releasing the system resource when the second system application exits operation.

In the second aspect, an apparatus for operating a second system application on a first system is provided in the embodiments of the present application, the apparatus includes:
  a creating module configured to create an operating environment of the second system application through a loader on a target terminal, the first system is operated on the target terminal;
  a generation module configured to generate an application function component of the second system application in the loader;
  a compiling module configured to compile script files of the second system application into dynamic library files by utilizing a compiling environment supported by the target terminal, and encapsulate the dynamic library files into an application package
  an execution module configured to install the application package through the loader, and execute the dynamic library files in the application package in the operating environment; wherein when the dynamic library file is executed, a corresponding function in the target terminal is called through the application function component to realize operation of the second system application in the first system.

In the third aspect, a terminal device is further provided in the embodiments of the present application, the terminal device includes a memory, a processor and a computer program stored in the memory and executable by the processor, wherein the processor is configured to implement any one of the methods described in the first aspect.

In the fourth aspect, a computer-readable storage medium is provided in the embodiments of the present application. The computer-readable storage medium stores a computer program, that, when executed by the processor, implement any one of the methods described in the first aspect.

In the fifth aspect, a computer program product is further provided in the embodiments of the present application. When the computer program product is executed on the terminal device, the terminal device is caused to implement any one of the methods described in the first aspect.

Beneficial Effects of the Invention

Beneficial Effects

As compared to the prior art, the beneficial effects of the embodiments of the present application are listed below: the loader having strong correlation with the target terminal is used to create the operating environment of the second system application and the application function component, and the compiling environment supported by the target terminal is utilized to compile the script files of the second system application and generate the application package. The script files of the second system application are compiled by utilizing the compiling environment supported by the target terminal, such that the target terminal can directly respond to the system instruction generated during the execution of the compiled dynamic library files without the need of parsing and converting the instruction, the cross-platform operation efficiency of the application program can be improved.

BRIEF DESCRIPTION OF THE DRAWINGS

Description of the Drawings

In order to describe the embodiments of the present application more clearly, a brief introduction regarding the accompanying drawings that need to be used for describing the embodiments of the present application or the existing technologies is given below; it is apparent that the accompanying drawings described below are merely some embodiments of the present application, a person of ordinary skill in the art may also acquire other drawings according to the current drawings without paying creative labor.

Figure 1:
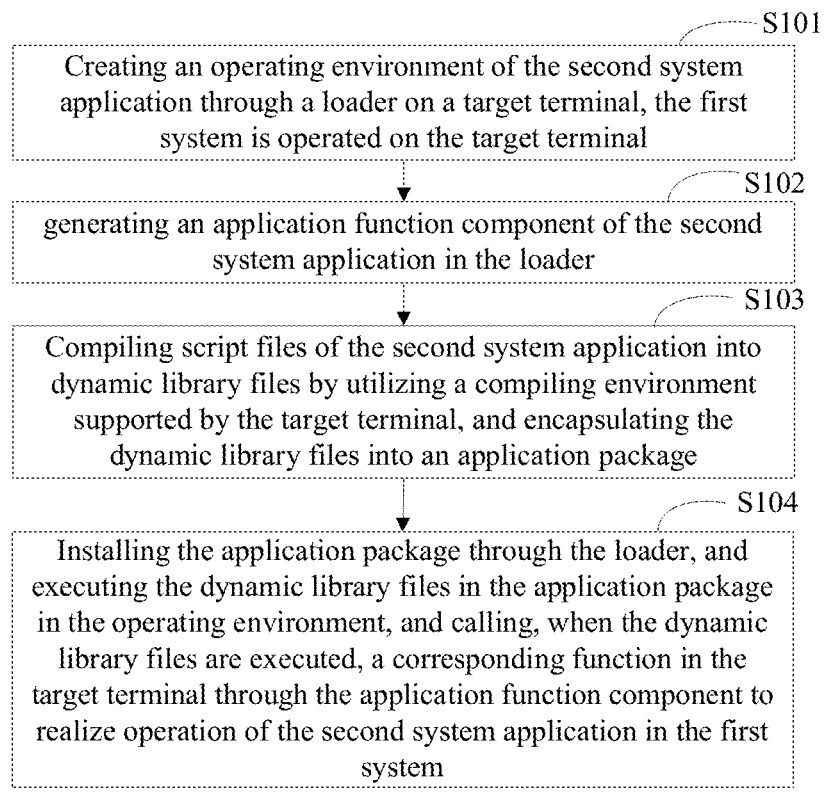
Figure 2:
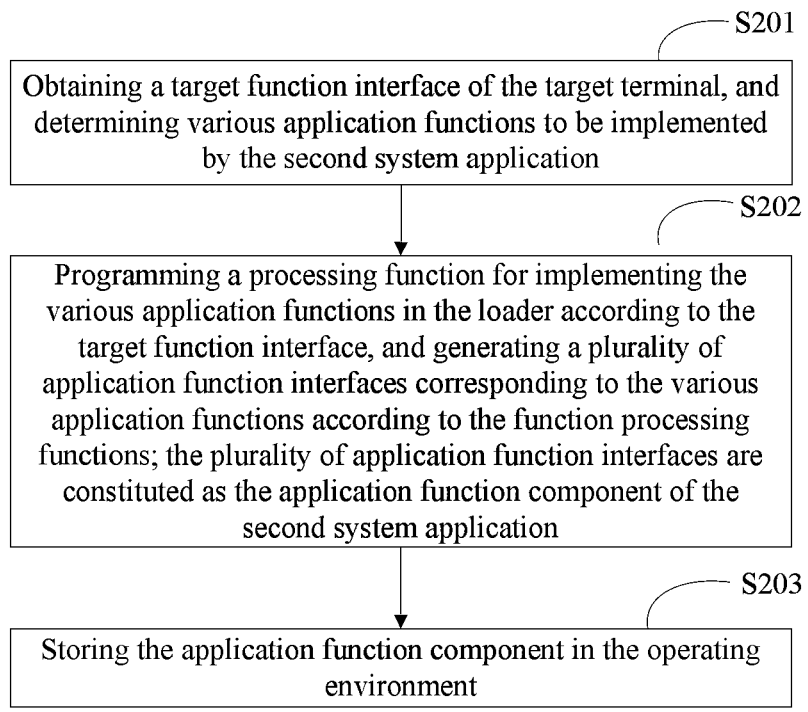
Figure 3:
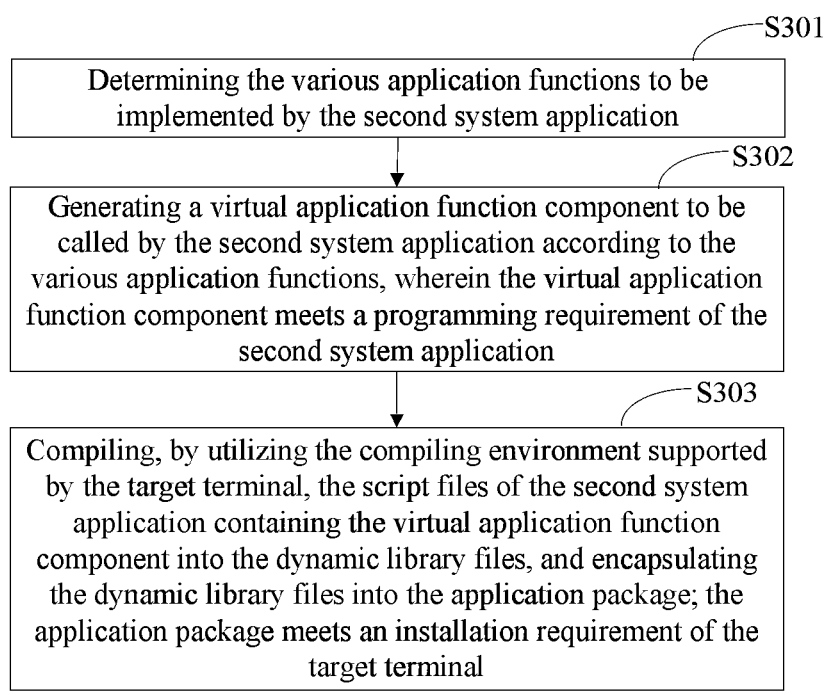
Figure 4:
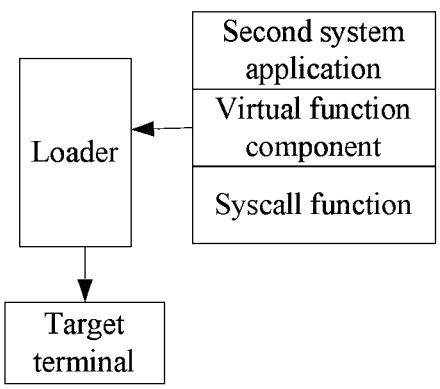
Figure 5:
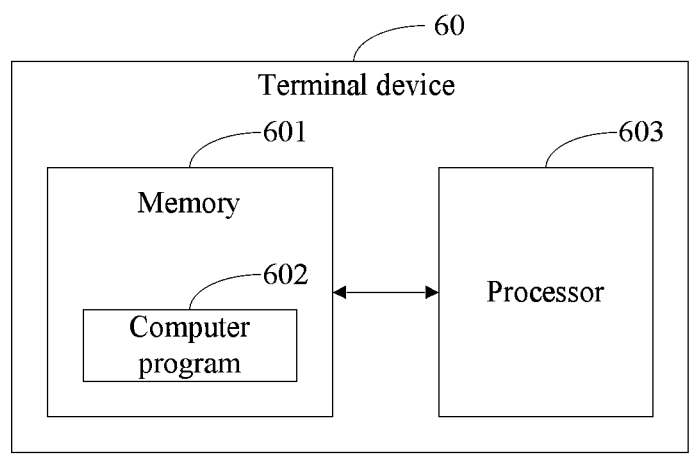
Figure 6:
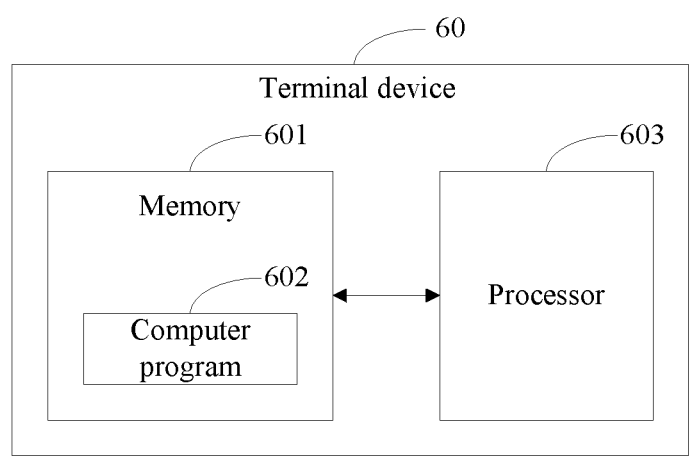

FIG. 1 illustrates a schematic flowchart of a method for operating a second system application on a first system provided by one embodiment of the present application;

FIG. 2 illustrates a schematic flowchart of a method for operating a second system application on a first system provided by another embodiment of the present application;

FIG. 3 illustrates a schematic flowchart of a method for operating a second system application on a first system provided by another embodiment of the present application;

FIG. 4 illustrates a schematic software architecture for operating the second system application on the first system according to one embodiment of the present application;

FIG. 5 illustrates a schematic structural diagram of an apparatus for operating a second system application on a first system according to one embodiment of the present application;

FIG. 6 illustrates a schematic structural diagram of a terminal device provided by one embodiment of the present application.

EMBODIMENTS OF THE INVENTION

Detailed Description of Embodiments

In the following descriptions, in order to describe but not intended to limit the present application, concrete details including specific system structure and technique are proposed to facilitate a comprehensive understanding of the embodiments of the present application. However, a person of ordinarily skill in the art should understand that, the present application can also be implemented in some other embodiments from which these concrete details are excluded. In other conditions, detailed explanations of method, circuit, device and system well known to the public are omitted, so that unnecessary details which are disadvantageous to understanding of the description of the present application may be avoided.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should be further understood that, terms "and/or" used in the description and the annexed claims of the present application are referred to as any combination of one or a plurality of listed item(s) associated with each other and all possible items, and including these combinations.

As is used in the description and the annexed claims, a term "if" may be interpreted as "when" or "once" or "in response to determination" or "in response to detection". Similarly, terms such as "if it is determined that", or "if it is detected that (a described condition or event)" may be interpreted as "once it is determined" or "in response to the determination" or "once it is detected that (the described condition or event)" or "in response to the detection (the described condition or event)".

Additionally, in the descriptions of the specification and the appended claims of the present application, terms such as "first", "second", "third", etc., are only intended to be distinguished in description, and thus shouldn't be interpreted as indication or implication of a relative importance.

A method for operating a second system application in a first system provided in this embodiment of the present application may be applied to a terminal device such as a mobile phone, a tablet computer, a notebook computer, an ultra-mobile personal computer (Ultra-Mobile Personal Computer, UMPC), a netbook, etc., the type of the terminal device is not limited in the embodiments of the present application.

Referring to FIG. 1, FIG. 1 illustrates an implementation flowchart of operating the second system application in the first system according to one embodiment of the present application.

In a step of S101, an operating environment of the second system application is created through a loader on a target terminal. The first system is operated on the target terminal.

In application, the target terminal may be a terminal device such as a point of sale (Point of Sale, POS) terminal, a mobile phone, a tablet computer, a notebook computer, or the like, the target terminal is not limited herein. The loader may be configured to read an executable file (script files of a system application), write the content of the executable file into a memory, and enable the executable file to be operated. The first system includes, but is not limited to, a Prolin system, Linux system and other systems. The second system is different from the first system, and the second system also includes, but is not limited to, other systems such as PaxMe system, Android system. For the convenience of explanation, the present application is described by taking the first system as the Prolin system and taking the second system as the PaxMe system as an example. The Prolin system is a multi-task operating system developed based on Linux, and the PaxMe system is a single-task operating system.

The PaxMe system may be used to implement functions such as consumption and transferring of the POS terminal. A software layer of the PaxMe system includes a user layer, a multi-application management layer, a device driver layer, and a boot layer. The user layer serves to implement an application function. The multi-application management layer provides scheduling and management functions of sub-applications, the multi-application management layer also serves as a single-application mode for implementing application function. The device driver layer serves to implement the driving functions and is responsible for security and authority control. The boot layer serves to boot up and guide hardware. A hardware layer in the PaxMe system includes: a secure CPU configured to implement functions such as the processing of an operation instruction and the processing of internal and external security trigger mechanism. A magnetic card module is configured to communicate with the secure CPU through a serial peripheral interface. A screen interface is configured to display processing information. A physical button is configured to interact with the external. A non-contact module has a standard specification for performing transaction and authentication with a smart card (i.e., Integrated Circuit Card, IC Card). A printer is configured to print a processing result of the secure CPU on a related medium. An IC card reader is configured to identify the IC card. A wireless communication module is configured to communicate with the external. A memory is configured to store a system program and various data. A modem is configured to convert a digital signal into an analog signal and transmit the analog signal, and convert a received analog signal into a digital signal by demodulation the analog signal. An Ethernet module is configured to define an adopted signal processing method.

In application, the loader is an application file having a strong correlation with the target terminal. In order to support a PaxMe application, the target terminal needs to develop the loader on the current target terminal firstly, and then package and install the loader on the target terminal as a system application component of the target terminal. When the target terminal needs to operate the PaxMe application, the target terminal may call its own loader to load and operate the PaxMe application.

In application, said operating environment is a virtual machine layer operated by the PaxMe application. For the PaxMe application, in order to enable the PaxMe application to be loaded and operated on the target terminal that operates the Prolin system, the target terminal needs to be provided with a corresponding operating environment, which may be created in the loader.

At a step of S102, an application function component of the second system application is created in the loader.

In application, the application function component includes, but is not limited to, an entry component of the PaxMe application, an exit component of the PaxMe application, an operating component (various application function components) of the PaxMe application, etc., and the aforesaid application function component is not limited herein.

In application, when the operating environment of the PaxMe application is created, the creating of the operating environment is for the purpose of allowing the loader to load the PaxMe application. However, loading of the PaxMe application requires a corresponding loading function component (the entry function of the PaxMe application, that is, an entry function component), and jumps to the PaxMe application, so that a system platform of the target terminal starts to operate the PaxMe application, thereby completing loading and booting up of the PaxMe application. Thus, the application function component that creates the PaxMe application needs to be loaded in the loader.

In a step of S103, the script file of the second system application is compiled into a dynamic library file by using a compiling environment supported by the target terminal, and the dynamic library file is encapsulated into an application package.

In application, the compiling environment is provided by a development tool and is used for compiling the script file. A compiling tool chain supported by the Prolin system is added to the development tool, so that a program source code (i.e., the script file) of the PaxMe application can be directly compiled into the dynamic library file supported by the target terminal. For the target terminals of different system platforms, the supported compilation environments are also different. The differences are embodied in that, when the PaxMe application is compiled, the compiling tool chain supported by a client terminal corresponding to the PaxMe system is used, the binary instructions in the compiled dynamic library file are PaxMe system instructions. The client terminal instructions need to be parsed one by one during execution process, then, the target terminal is controlled according to a parsed result. In this embodiment, during compiling process, the compiling tool chain supported by the Prolin system is used to generate the compiling environment supported by the target terminal, so that the internal binary file instructions of the compiled dynamic library file are the instructions supported by the Prolin system. Thus, when the PaxMe application is operated on the target terminal, there is no need to perform an instruction conversion, so that the operating efficiency of the PaxMe application is improved. Moreover, there is no need to perform an instruction conversion between different system platforms (i.e., a conversion from a PaxMe system instruction to a Prolin system instruction) during operation of the PaxMe application, so that performing of anomaly analysis in the development process of the PaxMe application is facilitated greatly, developers can rapidly and accurately determine the found problems.

In application, said application package is a program package that can be downloaded and installed by the target terminal. Application package formats required by different systems may be different. For example, the Android system supports an application package in APK format, the Prolin system supports an application package in an AIP format, and the like.

In application, the process of compiling the script files may be: generating intermediate files by performing preprocessing of compiling, assembly and other steps on the application source codes (i.e., the script files), and then linking the intermediate files to generate an application program target file (i.e., the dynamic library file).

In a step of S104, the application package is installed through the loader, and the dynamic library file in the application package is operated in the operating environment. Where, when the dynamic library file is operated, a corresponding function in the target terminal is called through the application function component, so that the operation of the second system application in the first system is realized.

In application, when the PaxMe application is loaded, the loader may parse the script files (i.e., the dynamic library file) of the PaxMe application, and load the PaxMe application into a memory space in the loader to complete preparation work before the operation of the PaxMe application. During operation, the PaxMe application calls hardware in the target terminal through the application function component so as to implement corresponding functions.

In this embodiment, the operating environment of the second system application and the application function component are created by using the loader having strong correlation with the target terminal, and the script files of the second system application are compiled to generate the application package by using the compiling environment supported by the target terminal. By compiling the script files of the second system application by using the compiling environment supported by the target terminal, such that the target terminal can directly respond to the system instruction generated by the compiled dynamic library file during operation of the dynamic library file without the need of parsing and converting the instruction, a cross-platform operation efficiency of the application program can be improved.

Referring to FIG. 2, In application, the step S102 includes:

In a step of S201, a target function interface of the target terminal is obtained, and various application functions to be implemented by the second system application are determined.

In application, the target function interface is used for controlling various hardware of the target terminal when the loader is operated. The various application functions to be implemented by the second system application are the developed application functions during development of the PaxMe application.

In a step of S202, a processing function for implementing the various application functions in the loader are programmed according to the target function interface, application function interfaces corresponding to the various application functions are generated according to the processing function. The plurality of application function interfaces are constituted as an application function component of the second system application.

In application, the application function interfaces are generated according to the target function interface is implemented as: when the application functions of the PaxMe application are to be implemented, there are corresponding processing functions. The corresponding processing functions are written into the interface to generate a corresponding application function interface. In this embodiment, in order to enable the PaxMe application to directly call the corresponding hardware of the target terminal through the loader to implement a corresponding function, the processing functions of the various application functions of the PaxMe application need to be programmed in the loader and are written into the various target function interfaces of the target terminal. The aforesaid application function component is constituted by a plurality of functional interfaces.

In application, programming the processing functions of the various application functions in the loader is implemented as: the processing functions of a plurality of PaxMe interfaces are programmed in the loader, then, the loader is installed in the target terminal as a system component, so that a host machine has the ability to process PaxMe API application logic. When the PaxMe application program is operated, the PaxMe API processing function and the PaxMe application program in the Loader in the application program operating environment created by the Loader are in the same memory space, such that the PaxMe application program can be realized by calling the PaxMe API in the loader through syscall.

In a step of S203, the application function component is stored in the operating environment.

In application, the application function component may also be stored in the loader, then, the loader loads the PAXME application. The PaxMe application will be operated in the operating environment, and the application function component is loaded into the operating environment simultaneously, so that the application function component and the PaxMe application are in the unified memory space. Therefore, the application function component is stored in the operating environment, such that the corresponding application function component can be called at any time to implement the corresponding function in the target terminal, when the PaxMe application is operated.

In this embodiment, the processing functions of the various application functions to be implemented in the second system application is written into the target function interfaces of the target terminal, the application function component is generated and stored in the operating environment, such that the application function component can be called by the PaxMe application in the loader at any time. Moreover, the loader is a system component having strong correlation with the target terminal, so that the target terminal has the function of processing application logics of PaxMe interfaces (i.e., the application function interfaces).

Referring to FIG. 3, In application, the step S103 includes:

In a step of S301, various application functions to be implemented by the second system application are determined.

The application functions to be implemented have been described in the aforesaid step S201, and thus are not repeatedly described herein.

In a step of S302, a virtual application function component to be called by the second system application is created according to the application functions. Where, the virtual application function component meets a programming requirement of the second system application.

In application, it is considered that, the virtual application function component may include virtual function interfaces of the various application functions to be implemented, these virtual function interfaces are used for meeting the programming requirement of the second system application. In particular, the virtual application function component is a LibPaxMe component, and the core function of the LibPaxMe component is to provide a PaxMe application programming interface (i.e., Application Programming Interface, API) (i.e., PaxMe function interface) to the PaxMe application so as to meet the programming requirement of the PaxMe application. A PaxMe syscall file is included in the PaxMe application, the PaxMe syscall file is a small library function called by a calling system, each syscall function is used for call a corresponding PaxMe API in the LibPaxMe component. However, in the design of the Lib-PaxMe component, an identifier of attribute_((weak)) is added in the syscall function, and a weak attribute is added to the Syscall function in the Libpaxme component to add a weak attribute in the syscall function of the LibPaxMe, so that the syscall function in the LibPaxMe is referred to as a weak symbol. A detection of the integrity of application symbols performed by the compiling environment in the target terminal is achieved.

At a step of S303, the script files of the second system application containing the virtual application function component are compiled into dynamic library files by using the compiling environment supported by the target terminal, and the dynamic library files are encapsulated into an application package. The application package meets the installation requirement of the target terminal.

In application, when the script files are compiled by the target terminal, the virtual application function component is also compiled into the application package and is installed by the loader. When the PaxMe application is operated, the virtual application function component corresponding to the PaxMe application will also be in a process space of the operating environment. However, as described the aforesaid step S202, the processing function for implementing the various application functions is implemented and stored in the operating environment of the loader. In other words, the PaxMe application uses the corresponding syscall function through the Libpaxme component by calling the application function interface in the loader. Then, the loader uses the processing function in the application function interface to complete the actual functions of the PaxMe application. That is, the virtual function component does not participate in implementation of service logics of the PaxMe application.

In application, the LibPaxMe component (i.e., the virtual function component) is only used by the compiling environment for detection of the integrity of application symbols. Therefore, the virtual function interface irrelevant to the actual operating environment of the target terminal is provided (syscall calling only exists in the virtual function interface, the actual processing function does not exist), and the virtual function interface is irrelevant to the specific system (i.e., Prolin) platform. Thus, codes irrelevant to the system platform may be compiled by using any compiling tool chain. That is, when the PaxMe application is compiled, the compiling chain supported by the target terminal may be used to compile the codes irrelevant to the system platform (LibPaxMe component). Binary files output by the compiling chain is the binary files supported by the Prolin system, and the output binary instruction can also be supported by the Prolin system, such that an effect of a direct operation of the PaxMe application on the target terminal can be implemented.

In this embodiment, the virtual application function component to be called by the second system application is created, such that the second system application can meet the programming requirement during programming without writing the processing function into the virtual application function component, so that the processing function does not participate in the implementation of the service logic of the PaxMe application. Thus, the compiling chain supported by the target terminal may be used to compile the codes irrelevant to the system platform, so that the effect of the direct operation of the PaxMe application on the target terminal can be implemented.

In one embodiment, the method for operating the second system application on the first system further includes:

writing a strong attribute function in the script files corresponding to the various application function interfaces included in the application function component. Where the strong attribute function includes first identifiers for identifying the application function interfaces, respectively.

In application, the aforesaid strong attribute function may specifically be a function of a non-attribute_((weak)) identifier, the strong attribute function may also be considered as function without adding the aforesaid attribute identifier in the script files corresponding to the application function interfaces. The strong attribute function is not limited herein. Correspondingly, the PaxMe application includes a PaxMe syscall file which is a small library function called by a calling system, and each syscall function may also call an application function interface having a non-weak attribute (i.e., the strong attribute function) in the loader so as to be called by the PaxMe application during operation. Where each of the syscall functions corresponding to the various application function interfaces has a corresponding first identifier for distinguishing. Additionally, the first identifier may be one or more of a number, a letter, and a special symbol, and is not limited herein.

A weak attribute function is written in the script files corresponding to the various virtual application function interfaces included in the virtual application function component, respectively. Where the weak attribute function includes second identifiers for identifying the various virtual application function interfaces, respectively.

In application, it is described from the above that the virtual application function component is a LibPaxMe component, in the design of the LibPaxMe component, the attribute_((weak)) identifier is added when the Syscall function is declared, the weak attribute is added to the syscall function in the LibPaxMe, so that the syscall in LibPaxMe is referred to as a weak symbol. Detection of the integrity of the application symbols by the compiling environment in the target terminal is achieved. Where each of the syscall functions corresponding to the various virtual application function interfaces has a corresponding first identifier used for distinguishing. Additionally, the second identifier may also be one or more of a number, a letter, and a special symbol. The second identifier is not limited herein. Moreover, the application function interface and the virtual application function interface have a correspondence relationship, the first identifier and the second identifier of the application function interface and the virtual application function interface may be the same identifier symbol. Syscall provides a set of standard interfaces for the kernel for the interaction between a user space program and a kernel space, these interfaces allows a user mode program to access a hardware device in a limited manner. In addition, in this embodiment, both the LibPaxMe component and the loader use the syscall function to establish an interaction channel between the LibPaxMe component and the loader so as to realize a parameter transfer from application data to the loader and a transfer of the calling result from the loader to the LibPaxMe component.

A correspondence relationship between the application function interfaces in the application function component and the various virtual application function interfaces in the virtual application function component is established according to the first identifiers and the second identifiers. Where the application function interfaces corresponding to the strong attribute function are used to be called by the second system application to implement a corresponding application function of the second system.

In application, due to the correspondence relationship, when the PaxMe application is loaded by the loader, the PaxMe application is in the operating environment in the loader, the corresponding virtual application function component is also in the operating environment. Moreover, the application function component writes the processing function into the loader through the target function interface of the target terminal. That is, when the PaxMe application is operated, the application function component having the strong attribute function and the virtual application function component having the weak attribute are within the same process space. However, the application function interfaces in the application function component has a correspondence relationship with the virtual application function interfaces in the virtual application function component. Thus, the application function interfaces having the same strong attribute function and the virtual application function interfaces having the weak attribute function are within the same process space at the same time. The system will call the application function interface having the strong attribute function, and ignores the characteristics of the virtual application function interface having the weak attribute function, so that the application function interface having the strong attribute function in the loader can be truly called when the PaxMe application is operated. Referring to FIG. 4, the PaxMe APP is the PaxMe application, the PaxMe application calls the virtual function interfaces in the LibPaxMe component, the virtual function interface is called into the loader through the syscall function, such that the virtual application function interface having the weak attribute function in a libmotor component is hijacked by the application function interface having the non-weak attribute function in the loader, and the function of the corresponding hardware in the target terminal is realized.

In this embodiment, the strong attribute function is written into the script files corresponding to the developed various application function interfaces, the weak attribute function is written into the script files corresponding to the virtual application function interfaces, such that the system uses the application function interfaces having the strong attribute function and ignores the virtual application function interfaces having the weak attribute function when the PaxMe application is operated, the application function interfaces having the strong attribute function in the loader is truly called, and the purpose of operating the second system application in the first system is achieved.

In application, after the step S104,
when the second system application calls the application function interface, a corresponding application function is not implemented in the target terminal, it is determined that the application function interface corresponding to the corresponding application function has a vulnerability.

In application, the vulnerability refers to the presence of defect in specific implementation or system security policy of hardware, software, and protocol, so that an attacker can access under an unauthorized condition, and accessing of sensitive data of the system without authorization is resulted. For example, the vulnerability may be whether a logged-in user has an authority to perform a requested operation on a requested object is not checked, and the hazard of the vulnerability is that an unauthorized access may result in data leakage, data loss, or data manipulation of an unauthorized party (e.g., PaxMe application). Thus, if the second system application calls the application function interface, and the corresponding application function is not implemented in the target terminal, it is determined that the application function interface corresponding to the corresponding application function has the vulnerability.

The corresponding application function interface is repaired according to the vulnerability.

In application, it is described that the processing function having the application function is within the application function interface in the loader, and the virtual function interfaces in the PaxMe application do not include the actual processing function. Therefore, when the vulnerability needs to be repaired, the corresponding application function interface only needs to be upgraded, there is no need to modify the PaxMe application, the inconvenience caused due to modification and recompilation of the PaxMe application is reduced, and an effect of reduction of workloads of application developers is achieved. In addition, the processing function is within the loader, a risk of leakage of core codes in the development process of the virtual function interfaces in the PaxMe application can be avoided.

In this embodiment, when an application function interface called by the second system application has the vulnerability, it is only necessary to repair the corresponding application function interface according to the vulnerability without the need of modifying the PaxMe application, so that the inconvenience caused by the modification and recompilation of the PaxMe application is reduced, and the effect of reduction of the workloads of the application developers is achieved.

In one embodiment, the step S103 includes:

A compiling tool chain supported by the target terminal is determined, and the compiling tool chain is added to a development tool. Where the compiling tool chain is used to enable the development tool to directly compile the script files of the second system application into the dynamic library files supported by the target terminal.

In application, the compiling tool chain is a compiling chain in a development tool supported by the target terminal when the PaxMe application is compiled by using the development tool. The aforesaid development tool may also be considered as a tool supported by the target terminal. In particular, the development tool may refer to a PaxPay Pro 2017 tool described in the existing document "Prolin PaxMe Virtual Machine Programming Guide". Mainly, the development tool supporting the target terminal differs from the development tool used by the original PaxMe application in that the compilation tool chain supported by the target terminal system (i.e., the Prolin system) is added; and the virtual function component (i.e., the LibPaxMe component) of the PaxMe system is added. Since the virtual function component does not have the actual processing function, so that the compiling tool chain supported by the target terminal system can be used to compile the virtual function component.

After verifying that the virtual application function component is qualified, the script files of the second system application are compiled into the dynamic library files.

In application, it is described that the virtual function component is only used to meet the programming requirement, and the weak attribute function added in the virtual function component is used to meet the requirement of check of the integrity of the application symbols through the compiling environment. Thus, the verification may be performed based on whether the virtual functional component meets the programming requirement and whether the virtual functional component has the weak attribute function. After verifying that the virtual function component is qualified, the script files of the second system application are compiled into the dynamic library files.

A target packaging strategy of the target terminal is determined according to an operation instruction of a user, and the script files are packaged according to the target packaging strategy to generate an application package meeting an installation requirement of the target terminal.

In application, the target packaging strategy is a packaging manner that meets the installation requirement of the target terminal. In particular, a dynamic library file packaging process includes: determining a target packaging strategy of the target terminal, and packaging the dynamic library files according to the predetermined target packaging strategy. The determination of the target packaging strategy is determined by the development tool according to the target terminal selected by the user. Some packing manners supported by the system of the target terminal may be preset in the development tool. For example, the application package may be such as a bare bin application package supported by the native PaxMe system, an aip application package supported by the Prolin system, and the Android package (Android Package, APK) application package supported by the Android system. After the first system used by the target terminal is designated, the development tool may determine the target packaging strategy according to the system selected by the user. In order to support the Prolin system, the development tool can compress the dynamic library file through a ZIP compression format to generate the AIP application package supported by the Prolin system. Then, files in the application package are installed one by one to an installation path predetermined by the Prolin system according to the application management strategy of the target terminal to complete the installation of the PaxMe application.

In this embodiment, the compiling tool chain supported by the target terminal is determined, the script files of the second system application are compiled into the dynamic library files supported by the target terminal, so that the binary instructions in the compiled dynamic library files are the instructions supported by the Prolin system. Thus, when the PaxMe application is operated on the target terminal, there is no need to perform an instruction conversion, so that the operating efficiency of the PaxMe application is improved. Then, the target packaging strategy of the target terminal is determined, and the script files are packaged according to the target packaging strategy, such that the generated application package can be installed and operated on the target terminal.

In one embodiment, after the step of S104, the method further includes:

A system resource of the target terminal used by the second system application is recorded when the second system application is operating in the operating environment.

The system resource is released when the second system application exits operation.

In application, when the second system application is operated in the operating environment, the system resource of the target terminal needs to be used to implement the corresponding function. In particular, the system resource may be a memory resource of the target terminal that needs to be consumed when the second system application is in operation, or a handle resource of the target terminal being used to execute a memory block or an object managed by the first system or the database. The system resource is not limited herein. Due to the fact that the second system application is operated in the operating environment in the loader, the system resource of the target terminal used by the second system application may be recorded through the loader.

In this embodiment, when the PaxMe application is operated, the system resource of the target terminal needs to be utilized to implement the corresponding function. When the PaxMe application is exited, a system function called by the PaxMe application needs to be released. However, in an actual process, a resource leakage may exist due to the presence of defect in the PaxMe application when the application is exited. Thus, when the PaxMe application is operated, the loader may record all system resources of the target terminal utilized by the PaxMe application and release these system resources together, thereby avoiding the problem of resource leakage of the first system caused due to a design defect of the PaxMe application, and providing a strong support for long-time stable and reliable operation of the first system.

In other embodiments, the loader is transplanted to the remaining selected terminals as the target terminal. Since the application functional component of the PaxMe application is within the loader, so that the PaxMe application meets the application compilation requirement only through the LibPaxMe component. Thus, when the used target terminal is switched (i.e., the Prolin system is switched to other system), it only needs to transplant the loader on the new target terminal. The loader is provided with the operating environment of the second system application, then, the steps S102, the step S103 and the step S104 may be used to implement operating the PaxMe application on the first system corresponding to the new target terminal quickly, a work of repetitive development of the PaxMe application among different systems is greatly reduced.

As shown in FIG. 5, an apparatus 100 for operating a second system application on a first system is further provided in the embodiments of the present application, the apparatus includes:
- a creating module 10 configured to create an operating environment of the second system application through a loader on a target terminal, the first system is operated on the target terminal;
- a generation module 20 configured to generate an application function component of the second system application in the loader;
- a compiling module 30 configured to compile script files of the second system application into dynamic library files by utilizing a compiling environment supported by the target terminal, and encapsulate the dynamic library files into an application package;
- an execution module 40 configured to install the application package through the loader, and execute the dynamic library files in the application package in the operating environment; wherein when the dynamic library file is executed, a corresponding function in the target terminal is called through the application function component to realize operation of the second system application in the first system.

In one embodiment, the generation module 20 is further configured to:
- obtain a target function interface of the target terminal, and determine various application functions to be implemented by the second system application;
- program a processing function for implementing the various application functions in the loader according to the target function interface, and generate application function interfaces corresponding to the various application functions according to the processing function; the plurality of application function interfaces are constituted as the application function component of the second system application;
- store the application function component in the operating environment.

In one embodiment, the compiling module 30 is further configured to:
- determine the various application functions to be implemented by the second system application;
- create a virtual application function component to be called by the second system application according to the various application functions; where the virtual application function component meets a programming requirement of the second system application;
- compile the script files of the second system application containing the virtual application function component into the dynamic library files by utilizing the compiling environment supported by the target terminal, and encapsulate the dynamic library files into the application package that meets an installation requirement of the target terminal.

In one embodiment, the apparatus 100 for operating the second system application on the first system further includes:
- a first writing module configured to respectively write a strong attribute function into the script files corresponding to the various application function interfaces of the application function component; where the strong attribute function includes first identifiers for identifying the various application function interfaces, respectively;
- a second writing module configured to respectively write a weak attribute function into the script files corresponding to the various virtual application function interfaces of the virtual application function component; where the weak attribute function includes second identifiers for identifying the various virtual application function interfaces, respectively;
- an establishing module configured to establish a correspondence relationship between the various application function interfaces in the application function component and the various virtual application function interfaces in the virtual application function component according to the first identifiers and the second identifiers; where the application function interfaces corresponding to the strong attribute function are used to be called by the second system application to realize corresponding application functions of the second system.

In one embodiment, the apparatus 100 for operating the second system application on the first system further includes:
- a determination module configured to determine, if a corresponding application function cannot be implemented in the target terminal when the application function interface is called by the second system application, that the application function interface corresponding to the corresponding application function has a vulnerability;
- a fixing module configured to fix the corresponding application function interface according to the vulnerability.

In one embodiment, the compiling module 30 is further configured to:
- determine a compiling tool chain supported by the target terminal, and add the compiling tool chain to a development tool; where the compiling tool chain is used to enable the development tool to directly compile the script files of the second system application into the dynamic library files supported by the target terminal;

compile the script files of the second system application into the dynamic library files after verifying that the virtual application function component is qualified;

determine a target packaging strategy of the target terminal according to an operation instruction of a user, and package the script files to generate the application package meeting the installation requirement of the target terminal according to the target packaging strategy.

In one embodiment, the apparatus 100 for operating the second system application on the first system further includes:

a recording module configured to record a system resource of the target terminal utilized by the second system application when the second system application is operated in the operating environment;

a releasing module configured to release the system resource when the second system application exits operation.

FIG. 6 illustrates a schematic diagram of a terminal device 60 provided by one embodiment of the present application. As shown in FIG. 6, the terminal device 60 includes: a processor 603, a memory 601 and a computer program 602 stored in the memory 601 and executable by the processor 603. The processor is configured to implement the steps (e.g., the steps S101-S103) in the various method embodiments when executing the computer program 602. As an alternative, the processor 603 is configured to implement the functions of the modules/units in the various apparatus embodiments when executing the computer program 602.

For example, the computer program 602 may be divided into one or a plurality of modules/units, the one or plurality of modules/units are stored in the memory 601, and are executed by the processor 603 so as to implement the present application. The one or plurality of modules/units may be a series of computer program instruction segments that can accomplish particular functionalities, these instruction segments are used for describing an executive process of the computer program 602 in the terminal device 60. For example, the computer program 602 may be divided into a creating module, a generation module, a compiling module and an execution module, the specific functions of the various modules are described below:

The creating module is configured to create an operating environment of the second system application through a loader on a target terminal. The first system is operated on the target terminal.

The generation module is configured to generate an application function component of the second system application in the loader.

The compiling module is configured to compile script files of the second system application into dynamic library files by utilizing a compiling environment supported by the target terminal, and encapsulate the dynamic library files into an application package.

The execution module is configured to install the application package through the loader, and execute the dynamic library files in the application package in the operating environment. Where when the dynamic library file is executed, a corresponding function in the target terminal is called through the application function component to realize operation of the second system application in the first system.

The terminal device 60 can be a wearable device or be a mountable device. The terminal device can include but is not limited to: the processor 603, the memory 601. The person of ordinary skill in the art can understand that, FIG. 6 is merely an example of the terminal device 60, and is not constituted as limitation to the terminal device 60. More or less components than the components shown in FIG. 6 may be included, or some components or different components may be combined. For example, the terminal device may also include an input and output device, a network access device, a bus, etc.

The so-called processor 603 may be a central processing unit (Central Processing Unit, CPU), and may also be other general purpose processor, digital signal processor (Digital Signal Processor, DSP), application specific integrated circuit (Application Specific Integrated Circuit, ASIC), field-programmable gate array (Field-Programmable Gate Array, FGPA), or some other programmable logic devices, discrete gate or transistor logic device, discrete hardware component, etc. The general purpose processor may be a microprocessor. As an alternative, the processor may also be any conventional processor, or the like.

The memory 601 may be an internal storage unit of the terminal device 60, which may be such as a hard disk or a memory of the terminal device 60. The memory 601 may also be an external storage device of the terminal device 60, which may be such as a plug-in hard disk, a smart media card (Smart Media Card, SMC), a secure digital (Secure Digital, SD) card, a flash card (Flash Card, FC) equipped on the terminal device 60. Furthermore, the memory 601 may not only include the internal storage unit of the terminal device 60, but also include the external memory of the terminal device 60. The memory 601 is configured to store the computer program, and other procedures and data needed by the terminal device 60. The memory 601 may also be configured to store data that has been output or being ready to be output temporarily.

A computer-readable storage medium is further provided in the embodiments of the present application. The computer-readable storage medium stores a computer program, that, when executed by the processor, implement the steps in the various method embodiments.

A computer program product is further provided in the embodiments of the present application. When the computer program product is executed on the terminal device, the terminal device is caused to implement the steps in the various method embodiments.

In the aforesaid embodiments, the descriptions of the various embodiments are respectively emphasized. Regarding a part of one embodiment which are not described or disclosed in detail, reference can be made to the relevant descriptions in other embodiments.

When the integrated unit is achieved in the form of software functional units, and is sold or used as an independent product, the integrated unit may be stored in a computer readable storage medium. Based on this understanding, a whole or part of flow process for implementing the method in the embodiments of the present application can also be accomplished by using the computer program to instruct relevant hardware. When the computer program is executed by the processor, the steps in the various method embodiments described above may be implemented. The computer program includes computer program codes that may be in the form of source code, object code, executable documents or some intermediate form, or the like.

The foregoing embodiments are only intended to explain the technical solutions of the present application, rather than limiting the technical solutions of the present application. Although the present application has been described in detail with reference to these embodiments, a person of ordinary skilled in the art should understand that, the technical solutions disclosed in the embodiments may also be amended, and some technical features in the technical solutions may also be equivalently replaced. The amendments or the equivalent replacements don't cause the essence of the corresponding technical solutions to be deviated from the spirit and the scope of the technical solutions of the embodiments of the present application, and thus should all be included in the protection scope of the present application.

What is claimed is:

1. A method for operating a second system application on a first system implemented by a terminal device, the method comprising:
   creating an operating environment of the second system application through a loader on a target terminal, wherein the first system is operated on the target terminal;
   generating an application function component of the second system application in the loader;
   compiling script files of the second system application into dynamic library files by utilizing a compiling environment supported by the target terminal, and encapsulating the dynamic library files into an application package;
   installing the application package through the loader, and executing the dynamic library files in the application package in the operating environment; and
   calling, when the dynamic library files are executed, a function of the target terminal corresponding to the dynamic library files through the application function component.

2. The method according to claim 1, wherein said generating the application function component of the second system application in the loader comprises:
   obtaining a target function interface of the target terminal, and determining various application functions to be implemented by the second system application;
   generating a processing function for implementing the various application functions in the loader according to the target function interface, and generating a plurality of application function interfaces corresponding to the various application functions according to the processing function; wherein the plurality of application function interfaces are constituted as the application function component of the second system application; and
   storing the application function component in the operating environment.

3. The method according to claim 1, wherein said compiling the script files of the second system application into the dynamic library files using the compiling environment supported by the target terminal, and encapsulating the dynamic library files into the application package comprises:
   determining various application functions to be implemented by the second system application;
   generating a virtual application function component to be called by the second system application according to the various application functions; wherein the virtual application function component meets a programming requirement of the second system application; and
   compiling the script files of the second system application containing the virtual application function component into the dynamic library files by utilizing the compiling environment supported by the target terminal, and encapsulating the dynamic library files into the application package; wherein the application package meets an installation requirement of the target terminal.

4. The method according to claim 3, further comprising:
   respectively writing a strong attribute function into the script files corresponding to various application function interfaces of the application function component; wherein the strong attribute function comprises first identifiers for identifying the various application function interfaces of the application function component, respectively;
   respectively writing a weak attribute function into the script files corresponding to various virtual application function interfaces of the virtual application function component; wherein the weak attribute function comprises second identifiers for identifying the various virtual application function interfaces of the application function component, respectively; and
   establishing a correspondence relationship between the various application function interfaces of the application function component of the second system application and the various virtual application function interfaces of the virtual application function component according to the first identifiers and the second identifiers; wherein the various application function interfaces of the application function component having the strong attribute function are used to be called by the second system application to realize application functions of the second system application corresponding to the various application function interfaces of the application function component.

5. The method according to claim 4, wherein after said installing the application package through the loader and operating the dynamic library files in the application package in the operating environment, the method further comprises:
   determining, if a corresponding application function corresponding to an application function interface cannot be implemented by the target terminal when the application function interface is called by the second system application, that the application function interface has a vulnerability; and
   fixing the application function interface according to the vulnerability.

6. The method according to claim 3, wherein said compiling the script files of the second system application containing the virtual application function component into the dynamic library files in the compiling environment supported by the target terminal, and encapsulating the dynamic library files into the application package comprises:
   determining a compiling tool chain supported by the target terminal, and adding the compiling tool chain to a development tool; wherein the compiling tool chain is used to enable the development tool to directly compile the script files of the second system application into the dynamic library files supported by the target terminal;
   compiling, after verifying that the virtual application function component is qualified, the script files of the second system application into the dynamic library files; and
   determining a target packaging strategy of the target terminal according to an operation instruction of a user, and packaging, according to the target packaging strategy, the script files to generate the application package meeting the installation requirement of the target terminal.

7. The method according to claim 1, wherein after said installing the application package through the loader and operating the dynamic library files in the application package in the operating environment, the method further comprises:

recording a system resource of the target terminal utilized by the second system application when the second system application is operated in the operating environment; and releasing the system resource when the second system application exits operation.

8. A terminal device, comprising a memory, a processor and a computer program stored in the memory and executable by the processor, wherein the processor is configured to, when executing the computer program, perform steps of a method for operating a second system application on a first system, comprising:

creating an operating environment of the second system application through a loader on a target terminal, wherein the first system is operated on the target terminal;

generating an application function component of the second system application in the loader;

compiling script files of the second system application into dynamic library files by utilizing a compiling environment supported by the target terminal, and encapsulating the dynamic library files into an application package;

installing the application package through the loader, and executing the dynamic library files in the application package in the operating environment; and calling, when the dynamic library files are executed, a function of the target terminal corresponding to the dynamic library files through the application function component.

9. The terminal device according to claim 8, wherein the processor is further configured to perform the step of generating the application function component of the second system application in the loader by:

obtaining a target function interface of the target terminal, and determining various application functions to be implemented by the second system application;

generating a processing function for implementing the various application functions in the loader according to the target function interface, and generating a plurality of application function interfaces corresponding to the various application functions according to the processing function; wherein the plurality of application function interfaces are constituted as the application function component of the second system application; and storing the application function component in the operating environment.

10. The terminal device according to claim 8, wherein the processor is further configured to perform the step of compiling the script files of the second system application into the dynamic library files using the compiling environment supported by the target terminal, and encapsulating the dynamic library files into the application package by:

determining various application functions to be implemented by the second system application;

generating a virtual application function component to be called by the second system application according to the various application functions; wherein the virtual application function component meets a programming requirement of the second system application; and compiling the script files of the second system application containing the virtual application function component into the dynamic library files by utilizing the compiling environment supported by the target terminal, and encapsulating the dynamic library files into the application package; wherein the application package meets an installation requirement of the target terminal.

11. The terminal device according to claim 10, wherein the processor is further configured to perform steps of:

respectively writing a strong attribute function into the script files corresponding to various application function interfaces of the application function component; wherein the strong attribute function comprises first identifiers for identifying the various application function interfaces of the application function component, respectively;

respectively writing a weak attribute function into the script files corresponding to various virtual application function interfaces of the virtual application function component; wherein the weak attribute function comprises second identifiers for identifying the various virtual application function interfaces of the application function component, respectively; and establishing a correspondence relationship between the various application function interfaces of the application function component of the second system function application and the various virtual application function interfaces of the virtual application function component according to the first identifiers and the second identifiers; wherein the various application function interfaces of the application function component having the strong attribute function are used to be called by the second system application to realize application functions of the second system application corresponding to the various application function interfaces of the application function component.

12. The terminal device according to claim 11, wherein after the step of installing the application package through the loader and operating the dynamic library files in the application package in the operating environment, the processor is further configured to perform steps of:

determining, if a corresponding application function corresponding to an application function interface cannot be implemented by the target terminal when the application function interface is called by the second system application, that the application function interface has a vulnerability; and fixing the application function interface according to the vulnerability.

13. The terminal device according to claim 10, wherein the processor is further configured to perform the step of compiling the script files of the second system application containing the virtual application function component into the dynamic library files in the compiling environment supported by the target terminal, and encapsulating the dynamic library files into the application package by:

determining a compiling tool chain supported by the target terminal, and adding the compiling tool chain to a development tool; wherein the compiling tool chain is used to enable the development tool to directly compile the script files of the second system application into the dynamic library files supported by the target terminal;

compiling, after verifying that the virtual application function component is qualified, the script files of the second system application into the dynamic library files; and determining a target packaging strategy of the target terminal according to an operation instruction of a user, and packaging, according to the target packaging strategy, the script files to generate the application package meeting the installation requirement of the target terminal.

14. The terminal device according to claim 8, wherein after the step of installing the application package through the loader and operating the dynamic library files in the application package in the operating environment, the processor is further configured to perform steps of:

recording a system resource of the target terminal utilized by the second system application when the second system application is operated in the operating environment; and releasing the system resource when the second system application exits operation.

15. A non-transitory computer-readable storage medium which stores a computer program, that, when executed by a processor, causes the processor to perform steps of a method for operating a second system application on a first system, comprising:

creating an operating environment of the second system application through a loader on a target terminal, wherein the first system is operated on the target terminal;

generating an application function component of the second system application in the loader;

compiling script files of the second system application into dynamic library files by utilizing a compiling environment supported by the target terminal, and encapsulating the dynamic library files into an application package;

installing the application package through the loader, and executing the dynamic library files in the application package in the operating environment; and calling, when the dynamic library files are executed, a function of the target terminal corresponding to the dynamic library files through the application function component.

* * * * *